(12) United States Patent
Iketani et al.

(10) Patent No.: US 8,554,018 B2
(45) Date of Patent: Oct. 8, 2013

(54) IMAGE PROCESSING DEVICE, IMAGE PROCESSING SYSTEM, IMAGE PROCESSING METHOD AND IMAGE PROCESSING PROGRAM

(75) Inventors: Akihiko Iketani, Tokyo (JP); Tomokazu Satou, Tokyo (JP); Sei Ikeda, Tokyo (JP); Masayuki Kanbara, Tokyo (JP); Naokazu Yokoya, Tokyo (JP)

(73) Assignee: NEC Corporation, Tokyo (JP)

( * ) Notice: Subject to any disclaimer, the term of this patent is extended or adjusted under 35 U.S.C. 154(b) by 1064 days.

(21) Appl. No.: 12/295,275

(22) PCT Filed: Mar. 14, 2007

(86) PCT No.: PCT/JP2007/055054
§ 371 (c)(1),
(2), (4) Date: Jan. 7, 2009

(87) PCT Pub. No.: WO2007/122911
PCT Pub. Date: Nov. 1, 2007

(65) Prior Publication Data
US 2009/0169133 A1  Jul. 2, 2009

(30) Foreign Application Priority Data
Mar. 30, 2006 (JP) ................................. 2006-094536

(51) Int. Cl.
*G06K 9/32* (2006.01)
*G06K 9/36* (2006.01)
*G09G 5/02* (2006.01)

(52) U.S. Cl.
USPC ............ 382/299; 382/276; 345/698; 345/699

(58) Field of Classification Search
None
See application file for complete search history.

(56) References Cited

U.S. PATENT DOCUMENTS 5,696,848 A * 12/1997 Patti et al. ...................... 382/254
6,075,905 A *  6/2000 Herman et al. ............... 382/284
(Continued)

FOREIGN PATENT DOCUMENTS

EP  1351502 A1  10/2003
JP  2007-52672 A  3/2007

OTHER PUBLICATIONS

High-resolution video mosaicing for documents and photos by estimating camera motion Authors: Sato, Tomokazu; Ikeda, Sei; Kanbara, Masayuki; Iketani, Akihiko; Nakajima, Noboru; Yokoya, Naokazu; Yamada, Keiji Computational Imaging II. Edited by Bouman, Charles A.; Miller, Eric L. Proceedings of the SPIE, vol. 5299, pp. 246-253 (2004).*

(Continued)

*Primary Examiner* — Michelle Entezari
(74) *Attorney, Agent, or Firm* — Sughrue Mion, PLLC (57) ABSTRACT

[PROBLEMS] In a system for converting a low resolution image to a high resolution image, it is difficult to carry out processing to generate a high resolution image for each frame in real time using temporally continuous frame images. [MEANS FOR SOLVING THE PROBLEMS] An image processing system includes a conversion parameter calculation unit 101, an initial image generation unit 102, a high resolution image generation unit 103, and an input image and conversion parameter storage unit 110, and converts the high resolution image generated at the previous frame in accordance with a current frame based on the conversion parameter for the current frame with respect to the previous frame so as to perform high resolution image generation processing of the current frame with the converted image as an initial value.

8 Claims, 5 Drawing Sheets

(56) References Cited

U.S. PATENT DOCUMENTS

| | | | |
|---|---|---|---|
| 6,078,936 A * | 6/2000 | Martin et al. | 715/201 |
| 6,295,377 B1 * | 9/2001 | Dufaux et al. | 382/236 |
| 6,333,949 B1 * | 12/2001 | Nakagawa et al. | 375/240.16 |
| 6,522,339 B1 * | 2/2003 | Orimo | 345/606 |
| 7,085,323 B2 * | 8/2006 | Hong | 375/240.25 |
| 7,260,274 B2 * | 8/2007 | Sawhney et al. | 382/284 |
| 7,463,783 B1 * | 12/2008 | Dugan et al. | 382/251 |
| 7,729,563 B2 * | 6/2010 | Kameyama et al. | 382/299 |
| 7,876,978 B2 * | 1/2011 | Berger et al. | 382/299 |
| 2002/0063807 A1 * | 5/2002 | Margulis | 348/745 |
| 2004/0141067 A1 * | 7/2004 | Nakayama et al. | 348/222.1 |
| 2004/0156561 A1 | 8/2004 | Yu-Chuan et al. | |
| 2007/0133794 A1 * | 6/2007 | Cloutier et al. | 380/200 |
| 2007/0296829 A1 * | 12/2007 | Nakamura et al. | 348/229.1 |

OTHER PUBLICATIONS

D. Capel "Image Mosaicing and Super-Resolution", Springer Verlag, Jan. 2004, pp. 86-147.

Communication from the European Patent Office issued Nov. 9, 2012 in counterpart European Application No. 07738525.0.

* cited by examiner

IMAGE PROCESSING DEVICE, IMAGE PROCESSING SYSTEM, IMAGE PROCESSING METHOD AND IMAGE PROCESSING PROGRAM

TECHNICAL FIELD

The present invention relates to an image processing device, an image processing system, an image processing method, and an image processing program. In particular, the present invention relates to an image processing device, an image processing system, an image processing method, and image processing program, which can improve the quality of moving images.

BACKGROUND ART

An example of traditional methods for improving image quality is described in Non-Patent Document 1. The image quality improving method restores a higher resolution image on a subject from a plurality of input images in which the same subject is taken so that positions of the subject are shifted by sub-pixel unit.

Assume that there are N input images (gn) ($0 \leq n \leq N-1$). In the method described in Non-Patent Document 1, each input image (gn) is regarded to be image taken by going through the image taking process expressed by the following equation.

$$gn(x,y) = s\downarrow(h(u,v) \ast f^\sim(Tn(x,y))) + \eta n(x,y) \quad (1)$$

Here, $f^\sim$ is a high resolution image of a subject, Tn is a geometric conversion for $n^{th}$ input image, h is a point spread function which is invariant and linear with respect to any coordinate (x, y) on the image, $s\downarrow$ is an operator for downsampling the image, and $\eta n$ is noise expressed by a normal distribution with mean zero. The above equation can be expressed in matrix operation form as the equation (2).

[Equation 1]

$$g_n = M_n \bar{f} + \eta_n \quad (2)$$

The $f^\sim$ in the equation (2) is a lexicographic ordering of a pixel value $f^\sim(x, y)$. The same goes for the gn and $\eta n$ in the equation (2). Also, Mn in the equation (2) is a single matrix into which Tn, h, and $s\downarrow$ in the equation (1), each of which is linear transformation, are combined.

The image taking process of all the input images can be put into a single equation to obtain the equation (3).

[Equation 2]

$$\begin{bmatrix} g_0 \\ g_1 \\ \vdots \\ g_{N-1} \end{bmatrix} = \begin{bmatrix} M_0 \\ M_1 \\ \vdots \\ M_{N-1} \end{bmatrix} \bar{f} + \begin{bmatrix} \eta_0 \\ \eta_1 \\ \vdots \\ \eta_{N-1} \end{bmatrix} \quad (3)$$

or $g = M\bar{f} + \eta$

At this equation, the maximum a posteriori estimate (fmap) of the high resolution image can be expressed as the equation (4).

[Equation 3]

$$f_{map} = \arg\max -\lambda \|f - f_{avg}\|^2 - \|Mf - g\|^2 \quad (4)$$

In this regard, favg is an average image for which the positions in each input image are adjusted to be aligned.

In order to solve this problem, a numerical calculation technique such as a conjugate gradient method or the like is generally used. That is, starting the calculation from a certain initial value, an optimum solution can be obtained by converging solutions with performing an iterative calculation.

Non-Patent Document 1: D. Capel "Image Mosaicing and Super-Resolution", Springer Verlag, January, 2004, pp. 86-147

DISCLOSURE OF THE INVENTION

Problem to be Solved by the Invention

Although the above method is intended to generate a high resolution still image as an output by inputting a plurality of low resolution images, the method is also applicable to a system for outputting a high resolution moving image by inputting a low resolution moving image. Upon application of the method to such a system, for each frame of the low resolution moving image, continuous frames located in a temporal neighborhood of the frame are inputted to generate a high resolution still image of the same frame by the above processing. By continuously playing back the image generated for each frame, a high resolution moving image can be generated.

However, it is difficult to generate the high resolution moving image in real time with the above method. The reason is that, since the high resolution moving image generation is performed by an iterative calculation in the above method, the amount of throughput required for obtaining a high resolution image for each frame becomes high. Generally, dedicated hardware is essential for real-time processing of NTSC video signals.

It is therefore object of the present invention to provide an image processing device, an image processing system, an image processing method, and an image processing program, which can provide higher resolution moving images in real time.

Means for Solving the Problem

The image processing device and image processing system according to the present invention includes a conversion parameter calculation unit, an initial image generation unit, a high resolution image generation unit, and an input image and conversion parameter storage unit. The image processing device and image processing system can achieve the object of the present invention by converting the high resolution image generated at the previous frame in accordance with a current frame based on the conversion parameter for the current frame with respect to the previous frame, and, by using the converted high resolution image as an initial value, performing the high resolution image generation processing of the current frame.

Effects Of The Invention

According to the present invention, the number of iterative calculations at high resolution image generation processing can be reduced. The reason is that, since the high resolution image of the previous frame can be considered to be similar to the high resolution image of the current frame desired to be generated, the previous frame is utilized as an initial value of the high resolution image generation processing at the current frame. With this, the iterative calculation can be started from the initial value that is close to the optimal solution. Therefore, the amount of throughput required for obtaining high resolution for each frame is reduced, and thus a moving image with higher resolution can be realized in real time without equipping the dedicated hardware or the like.

Best Mode For Carrying Out The Invention

Next, the best mode for carrying out the present invention will be described with reference to the drawings.
(Exemplary Embodiment 1)

Figure 1:
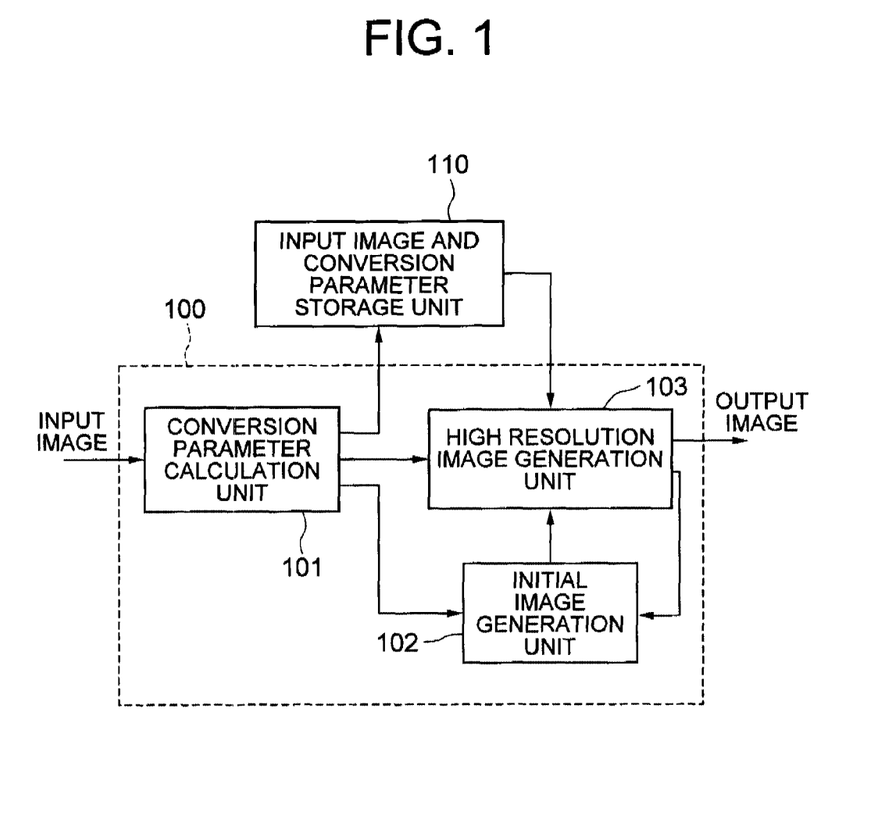
FIG. 1 is a block diagram showing the configuration of a first exemplary embodiment of the image processing device according to the present invention.

In FIG. 1, a first exemplary embodiment of the image processing device according to the present invention is configured by a computer (central processing device; processor; data processing device) 100 operable under program control, and an input image and conversion parameter storage unit 110.

The computer (central processing device; processor; data processing device) 100 includes a conversion parameter calculation unit 101, an initial image generation unit 102, and a high resolution image generation unit 103.

The conversion parameter calculation unit 101 calculates the conversion parameter that indicates the geometric transformation of a current frame with respect to the previous frame. The input image and conversion parameter storage unit 110 stores the current frame image and the conversion parameter calculated by the conversion parameter calculation unit 101. The initial image generation unit 102 transforms the high resolution image generated at the previous frame into an image that geometrically conforms to the current frame using the conversion parameter.

The high resolution image generation unit 103 generates the high resolution image of the current frame by the method disclosed in, for example, Non-Patent Document 1, using the continuous frames located in the temporal neighborhood of the current frame and their conversion parameters stored in the input image and conversion parameter storage unit 110, with the transformed image generated in the initial image generation unit 102 as an initial value. The generated high resolution image is delivered to the initial image generation unit 102 to be used for the high resolution image generation of the next frame.

Figure 2:
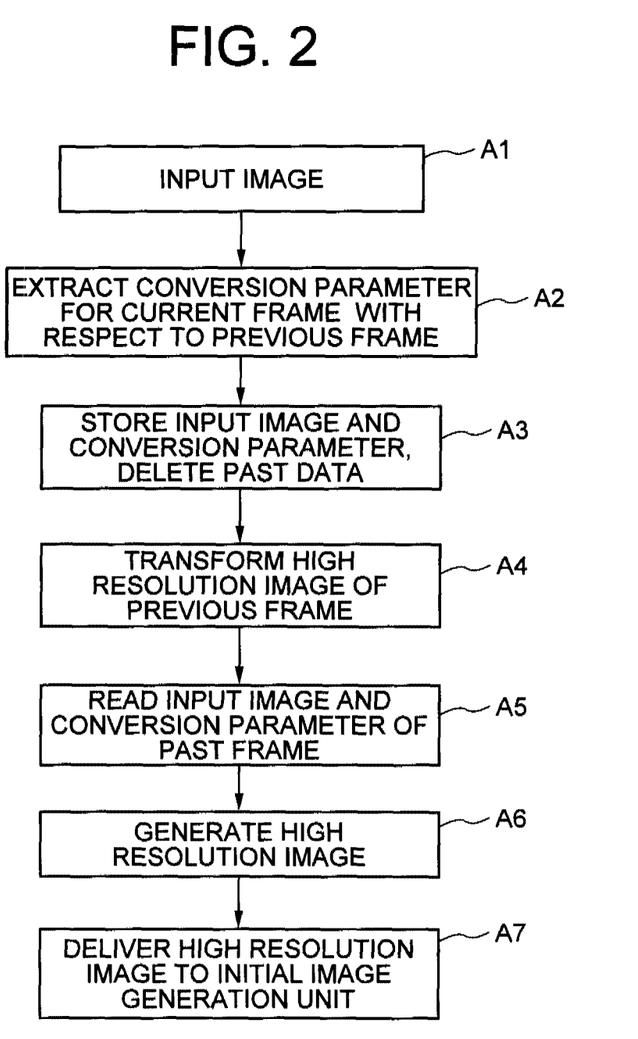
FIG. 2 is a flowchart showing the operation of the image processing device of a first exemplary embodiment.

Next, the overall operation of this exemplary embodiment will be described in detail with reference to FIG. 1 and the flowchart of FIG. 2.

First, a current frame image is inputted into the computer 100 (step A1). Then, the conversion parameter indicating the transformation of the current frame image with respect to the previous frame image is calculated in the conversion parameter calculation unit 101 (step A2). The input image of the current frame and the conversion parameter calculated by the conversion parameter calculation unit 101 are then stored in the input image and conversion parameter storage unit 110.

Here, since the storage capacity of the input image and conversion parameter storage unit 110 is limited, input images and their conversion parameters stored before certain number of frames are deleted from the storage area (step A3).

Next, the initial image generation unit 102 generates the high resolution image that geometrically conforms to the current frame by transforming the high resolution image generated at the previous frame by the high resolution image generation unit 103 using the conversion parameter for the current frame calculated by the conversion parameter calculation unit 101 (step A4). Here, the "geometrically conform" refers to the state in which the position, size, and posture of the subject in the high resolution image conform to those in the current frame.

The high resolution image generation unit 103 reads in the continuous frames located in the temporal neighborhood of the current frame and their conversion parameters stored in the input image and conversion parameter storage unit 110 (step A5). Here, the number of frames to be read in is the number of images necessary for the next high quality image generation processing (for example, ten), and is set by a user in advance.

The high resolution image generation unit 103 then performs high resolution image generation processing, with the image generated in the initial image generation unit 102 as an initial value, using the input images (continuous frames) and the conversion parameters read in at step A5 so as to output the generated image (step A6). Finally, the high resolution image generated in step A6 is delivered to the initial image generation unit 102 (step A7).

According to this exemplary embodiment, the image processing device transforms the high resolution image of the previous frame which can be considered to be similar to the high resolution image of the current frame desired to be generated into the image that geometrically conforms to the current frame, and utilizes the transformed image as an initial value of the high resolution image generation processing at the current frame. Accordingly, it becomes possible to start an iterative calculation based on the initial value that is close to the optimal solution, and thus the number of iterative calculations for each frame can be reduced; namely, the processing can be speeded up.
(Exemplary Embodiment 2)

Another exemplary embodiment for carrying out the present invention will next be described with reference to the drawings.

Figure 3:
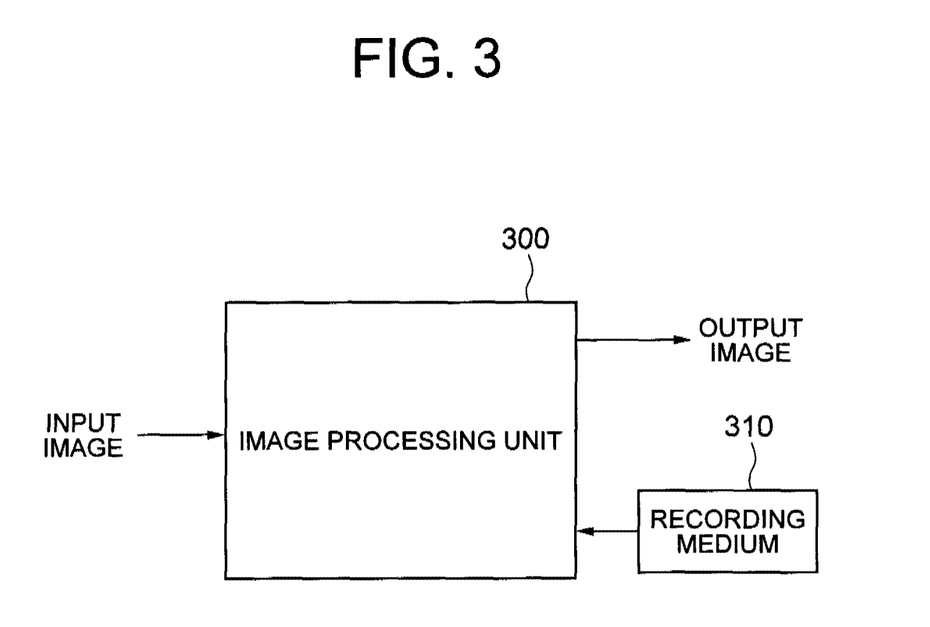
FIG. 3 is a block diagram showing the configuration of a second exemplary embodiment of the image processing device according to the present invention.

Referring to FIG. 3, the second exemplary embodiment of the image processing device of the present invention includes a recording medium 310 in which an image processing program is recorded. The recording medium 310 is, for example, a magnetic disk, a semiconductor memory, a magnetic tape, a CD (compact disk)-ROM, or a DVD (digital versatile disk), or may be other recording medium.

The image processing program is read into an image processing unit 300 from the recording medium 310. Alternatively, it may be downloaded from a server (not shown) or the like through a communication medium to be read into the image processing unit 300. By the image processing program be loaded into the main memory of the image processing unit 300 to be executed, the operation of the image processing unit 300 is controlled so that the image processing method of the present invention can be carried out.

The image processing program is the program for the image processing unit 300 to execute the functions of the conversion parameter calculation unit 101, the initial image generation unit 102, the high resolution image generation unit 103, and the input image and conversion parameter storage unit 110 of the first exemplary embodiment. In this exemplary embodiment, the memory included in the image processing unit 300 functions as the input image and conversion parameter storage unit 110 of the first exemplary embodiment.

EXAMPLE

Next, a specific example of the image processing system according to the present invention will be described with reference to FIGS. 4 and 5. This example corresponds to the first exemplary embodiment of the present invention.

Figure 4:
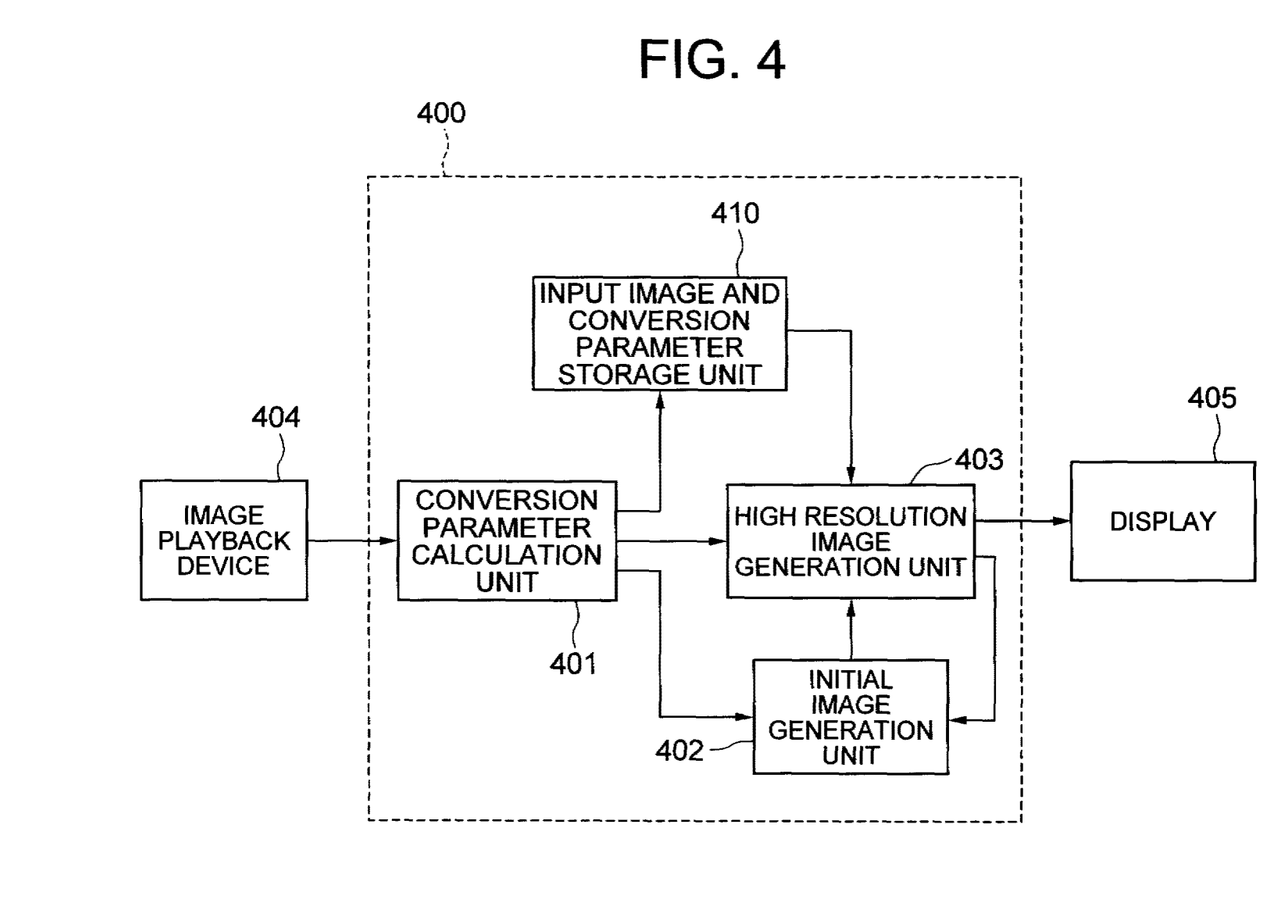
FIG. 4 is a block diagram showing the configuration of an example of the image processing system according to the present invention.

The image processing system of this example includes a video playback device 404 for outputting video signals, an image processing device 400, and a display 405 as shown in FIG. 4. The video playback device 404 is a device such as a hard disk recorder and the like that has the function of playing back prerecorded video, and is connected to the image processing device 400 through a composite terminal and/or a switch terminal. A display device of a plasma display and a liquid crystal television receiver or the like can be named as an example of the display 405. It is connected to the image processing device 400 through a D-terminal and/or an HMDI terminal.

The image processing device 400 is a computer (central processing device; processor; data processing device) operable under program control, and includes a conversion parameter calculation unit 401, an initial image generation unit 402, a high resolution image generation unit 403, and input image and conversion parameter storage unit 410.

Figure 5:
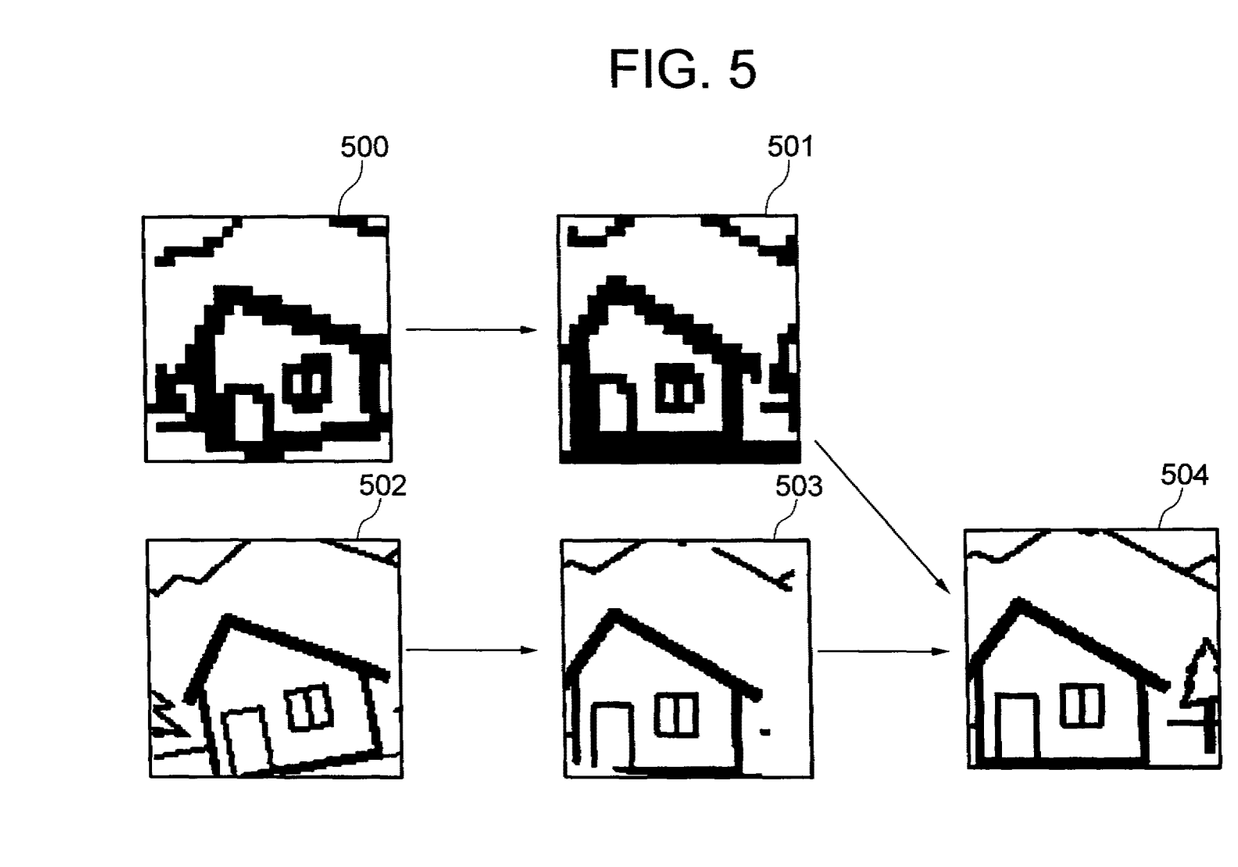
FIG. 5 is an illustration diagram showing the operation of the example.

The conversion parameter calculation unit 401 calculates the conversion parameter indicating the geometric transformation of a current frame image 501 with respect to a previous frame image 500 shown in FIG. 5. Specifically, for each point on the current frame image 501, each spot (congruent point) in the previous frame image 500 which is similar in luminance value distribution to a point on the current frame image 501 is obtained, and the conversion parameter that indicates the transformation in which each point and each spot are superposed respectively is obtained.

Typically, the model expressed as equation (5), in which a subject is assumed to be a plane, is frequently used as a conversion parameter for its simplicity. Here, (u1, v1, 1) and (u2, v2, 1) are homogeneous coordinates of congruent points respectively; a, b, c, d, e, f, g, h are image conversion parameters; and t is an arbitrary constant number.

[Equation 4]

$$\begin{pmatrix} u_2 \\ v_2 \\ 1 \end{pmatrix} = t \begin{pmatrix} a & b & c \\ d & e & f \\ g & h & 1 \end{pmatrix} \begin{pmatrix} u_1 \\ v_1 \\ 1 \end{pmatrix} \quad (5)$$

Or for more simplicity, constraint conditions such as $g=h=0, a=e=\cos\theta, -b=d=\sin\theta$ and the like are given.

The input image and conversion parameter storage unit 410 stores the current frame image 501 and the conversion parameter calculated by the conversion parameter calculation unit. The initial image generation unit 402 transforms the high resolution image 502 generated at the previous frame into the image (transformed image) 503 that geometrically conforms to the current frame using the conversion parameter.

The high resolution image generation unit 403 generates the high resolution image 504 of the current frame by the method disclosed, for example, in Non-Patent Document 1, using the continuous frames located in the temporal neighborhood of the current frame and their conversion parameters stored in the input image and conversion parameter storage unit 410 with the transformed image 503 generated by the initial image generation unit 402 as an initial value.

The generated high resolution image 504 is outputted to the display 405. Also, it is delivered to the initial image generation unit 402 to be used for the high resolution image generation of the next frame. By performing the foregoing processing for each frame, a high resolution moving image can be outputted.

Additionally, in this example, although the display 405 is given as an example of device into which the video signals outputted by the image processing device 400 are inputted, various kind of device such as a storage device or the like for storing video signals may be used as a device into which video signals are inputted.

INDUSTRIAL APPLICABILITY

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent applications No. 2006-094536, filed on Mar. 30, 2006, the disclosure of which is incorporated herein in its entirety by reference.

According to the present invention, it can be applied to such an application that when recording a moving image for example taken by a video camera of the NTSC method, the image can be stored being converted into the image having the same image quality and the same resolution as those of high-definition television in real time. Also, it can be applied to such an application that when playing back video signals recorded by the NTSC method on a playback device, the signals can be outputted to a display device being converted into the signals having same image quality and the same resolution as those of a high-definition television in real time. Also, it can be further applied to such an application that, when receiving and displaying the video of the NTSC method on a high-definition compliant television receiver, the video can be displayed being converted into the video having the same image quality and the same resolution as those of a high-definition television in real time.

DESCRIPTION OF REFERENCE NUMERALS

100 computer (central processing device; processor; data processing device)
101 conversion parameter calculation unit
102 initial image generation unit
103 high resolution image generation unit
110 input image and conversion parameter storage unit
300 image processing unit
310 recording medium
400 image processing device
401 conversion parameter calculation unit
402 initial image generation unit
403 high resolution image generation unit
404 image playback device
405 display
410 input image and conversion parameter storage unit
500 input image at previous frame
501 input image at current frame
502 high resolution image for previous frame

503 transformed image of high resolution image for previous frame
504 high resolution image for current frame

The invention claimed is:

1. An image processing device comprising:
a conversion parameter calculation unit for calculating a conversion parameter indicating a geometric transformation of a current frame with respect to a previous frame of input image data;
an initial image generation unit for transforming a high resolution image of the previous frame similar to a high resolution image of the current frame desired to be generated into an image that geometrically conforms to the high resolution image of the current frame by using the conversion parameter calculated by the conversion parameter calculation unit; and
a high resolution image generation unit for generating the high resolution image of the current frame by using the transformed image transformed by the initial image generation unit as an initial value for generating a high resolution image.

2. The image processing device as claimed in claim 1, wherein the high resolution image generation unit uses images of continuous frames located in a temporal neighborhood of the current frame as the input images.

3. The image processing device as claimed in claim 1, wherein the high resolution image generation unit outputs the generated high resolution image data to the initial image unit for a use at a high resolution image generation of a next frame.

4. The image processing device as claimed in claim 3, wherein the initial image generation unit generates the high resolution image that geometrically conforms to the current frame by transforming the high resolution image generated at the previous frame by the high resolution image generation unit using the conversion parameter for the current frame calculated by the conversion parameter calculation unit.

5. The image processing device as claimed in claim 4, wherein the initial image generation unit generates an image in a state where a position, size, and posture of a subject in the high resolution image conform to those in the current frame as a high resolution image geometrically conforming to the current frame.

6. An image processing device comprising:
conversion parameter calculation means for calculating a conversion parameter indicating a geometric transformation of a current frame with respect to a previous frame of input image data;
an initial image generation means for transforming a high resolution image of the previous frame similar to a high resolution image of the current frame desired to be generated into an image that geometrically conforms to the high resolution image of the current frame by using the conversion parameter calculated by the conversion parameter calculation means; and
high resolution image generation means for generating the high resolution image of the current frame by using the transformed image transformed by the initial image generation means as an initial value for generating a high resolution image.

7. A non-transitory computer readable medium storing an image processing program for causing a computer configuring an image processing device to execute the functions of:
calculating a conversion parameter indicating a geometric transformation of a current frame with respect to a previous frame of input image data;
transforming a high resolution image of the previous frame similar to a high resolution image of the current frame desired to be generated into an image that geometrically conforms to the high resolution image of the current frame by using the calculated conversion parameter; and
generating the high resolution image of the current frame by using the transformed image as an initial value for generating a high resolution image.

8. An image processing method comprising:
calculating a conversion parameter indicating a geometric transformation of a current frame with respect to a previous frame of input image data;
transforming a high resolution image of the previous frame similar to a high resolution image of the current frame desired to be generated into an image that geometrically conforms to the high resolution image of the current frame by using the calculated conversion parameter; and
generating the high resolution image of the current frame by using the transformed image as an initial value for generating a high resolution image.

* * * * *